Sept. 6, 1960 E. E. BAUMAN 2,951,910

SUBSTATION SIGNALLING DEVICE

Filed Jan. 22, 1958 3 Sheets-Sheet 1

INVENTOR.
EDWARD E. BAUMAN

BY Brown, Jackson, Boettcher & Dienner

Sept. 6, 1960 E. E. BAUMAN 2,951,910

SUBSTATION SIGNALLING DEVICE

Filed Jan. 22, 1958 3 Sheets-Sheet 2

INVENTOR.
EDWARD E. BAUMAN
BY Brown, Jackson, Boettcher & Dienner

Sept. 6, 1960 E. E. BAUMAN 2,951,910

SUBSTATION SIGNALLING DEVICE

Filed Jan. 22, 1958 3 Sheets-Sheet 3

INVENTOR.
EDWARD E. BAUMAN

BY

United States Patent Office 2,951,910

Patented Sept. 6, 1960

2,951,910

SUBSTATION SIGNALLING DEVICE

Edward E. Bauman, Galion, Ohio, assignor to North Electric Company, Galion, Ohio, a corporation of Ohio Filed Jan. 22, 1958, Ser. No. 710,563

25 Claims. (Cl. 179—87)

Figures 1, 7, 7A, 8:
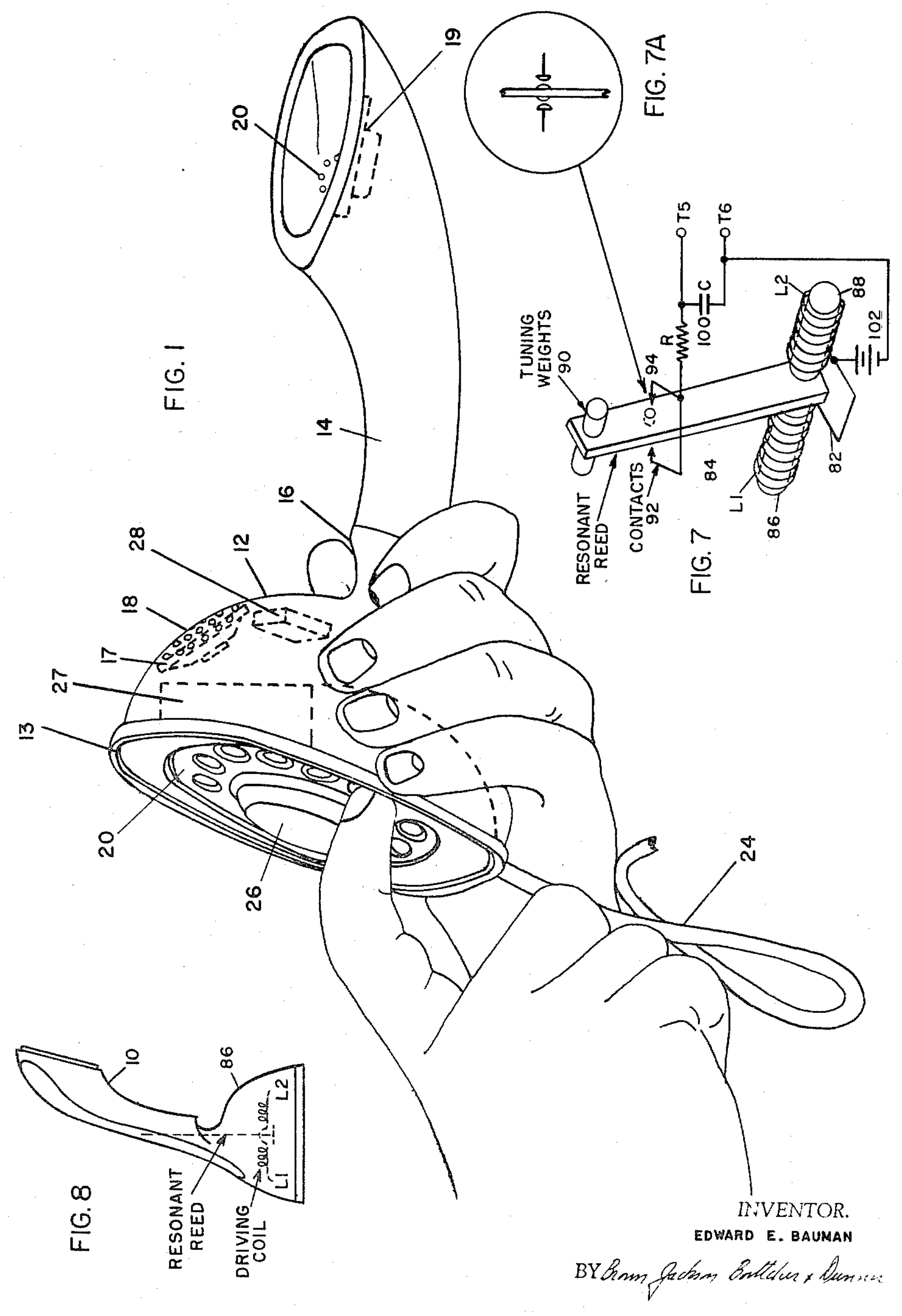

The present invention relates to a new and novel signaling arrangement, and particularly to a new and novel signaling device for use in telephone substation instruments.

Since the earliest stages of development in the telephone field there has been a constant effort to provide a telephone substation set of a more versatile and functional structure, and particularly of a telephone substation set which is of a substantially reduced size and weight. Early attempts in the field consisted of dividing the heavier components, such as the ringer device and its associated members from the subscriber substation, and mounting same in a separate box which was attached to a convenient mounting surface adjacent the telephone substation set. Such equipment was, of course, space consuming, unsightly and relatively more expensive.

In later years, the ringer equipment was gradually reduced in size, and by providing a desk stand type housing of a proportionally greater volume, it was possible to incorporate the substation components in the base of the substation set. However, such type unit became correspondingly heavier and more bulky than the previous type desk stand substation sets, and renewed efforts were directed toward the improvement of the desk stand type set. Since the signaling equipment which is used therein constitutes a major factor in the weight and size of the substation sets, particular attention was directed toward the development of new types of signaling equipment. Notwithstanding the substantial time and expense which have been directed toward such end, the desk stand substation sets now commercially available are still somewhat bulky in size, and of a relatively heavy weight.

There has been recently developed in the art, a novel telephone instrument of the standing hand-set type which is extremely light, compact and versatile, and such substation set is believed to constitute a definite step forward in the provision of a telephone instrument which incorporates the desirable features previously sought in the art. A telephone instrument of such type has been specifically set forth in the copending applications which were assigned Serial No. 264,114 and in U.S. design patent Serial No. 47,516; and U.S. Patent Nos. 2,405,543 and 2,419,388. However, as in previous type instruments, the standing hand set provides a limited amount of space for the signaling equipment, and there is a definite need for a signaling device of a reduced size and weight for use therewith.

It is a particular object of the present invention therefore to provide a novel signaling device of reduced size and weight, and particularly to provide an electronic signaling device which is especially well adapted for use with a telephone instrument of the standing hand set type.

It is an additional object of the invention to provide a novel signaling device of such type which is adaptive for use with either a single frequency ringing system or a selective frequency ringing system.

There is also a need in the art for a telephone signaling device which is more pleasant to the ear than the somewhat harsh gong signals used in sets now available commercially, and which is readily distinguishable from tone emission of other audible signaling devices normally located in the vicinity of a telephone substation. It is a specific object of the present invention therefore to provide a signaling device of reduced size and weight which provides a more pleasant and distinct signaling tone.

According to a particular feature of the invention, a novel signaling device of reduced size and weight is provided by utilizing a number of the existing components in the telephone transmitter-receiver network of the conventional substation set. In one embodiment, a miniature size power supply is operative in response to the application of twenty-cycle ringing signals to the substation to control a transistor blocking oscillator in the generation of a set of output pulses at the natural mechanical resonating frequency of the telephone receiver. A tank circuit in the output of the oscillator is operative therewith to generate an additional pulse set which provides a melodius "warble" effect in the signaling tone output of the receiver unit. The signal generating circuit in both instances are substantially reduced in size by utilizing the induction coil of the substation transmitter-receiver network as a component part thereof.

Other novel features of the signaling circuit include the high impedance characteristics of the device, and its ability to respond to ringing voltages of as low as 50 volts R.M.S. Further, the novel signaling circuit has electrical characteristics which effect no change in the transmission characteristics of the original telephone unit. According to an additional feature of the invention, a substation utilizing the novel signaling circuit may also be readily used as an extension phone on multi-party lines by reason of the inherent "dial tapping" preventive means in the ringing circuit.

Figure 2:
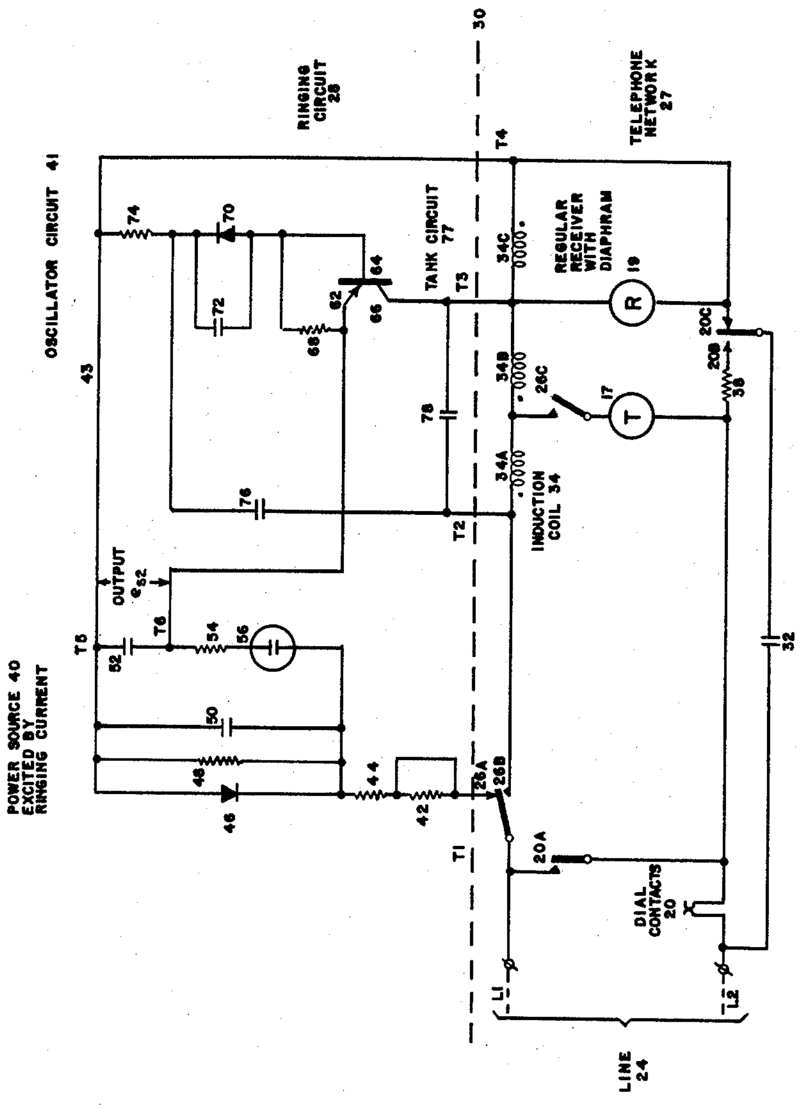

These and other features of the invention will become apparent with reference to the following specification and claims when considered in relation to the accompanying drawings in which Figure 1 is a perspective view of a telephone instrument of the standing microtelephone type which includes the novel signaling arrangement; Figure 2 is a schematic illustration of the circuit components of the telephone substation of Figure 1 including the components of the novel signaling arrangement, Figures 3, 4, 5A, 5B, 6A and 6B are wave form representations of the signal occurrences in the circuits of Figure 2 responsive to the receipt of ringing signals thereby and Figures 7, 7A and 8 are schematic views of the selective-frequency response ringing device of the invention.

*General description*

The new and novel signaling equipment of the invention lends itself to use in any of the conventional types of substation devices, the unit having particular utility in the telephone instrument known in the art as the standing microtelephone type. Such type instrument is illustrated in perspective in Figure 1, and as there shown, generally comprises a molded instrument having a base portion 12 with a flat bottom support face 13 upon which the unit normally rests, and an elongated receiver-supporting handle 14 which extends upwardly along an axis which is inclined forwardly relative to a line which extends perpendicular to the bottom face 13. A deep longitudinal groove 16 joins the mating portions of the base 12 and receiver handle 14 to permit the firm grasping of the instrument by the hand of the user. That is, the height of the groove 16 in the longitudinal direction of the handle corresponds approximately to the width of the thumb so that, in use, the inside or palm of the hand rests against the rearward portion of the base, and the thumb, and possibly the forefinger, rests in the groove 16. A series of apertures 18 in the forward sloping face of the base provide communication with the transmitter element (not shown) for the substation, and a set of apertures 20 in the upper end of the receiver handle 14 provide means for communicating the output of the receiver element (not shown) to the ear of the user. A conventional dial mechanism 20 is located in a recessed portion on the bottom face 13. Identification numerals on a number plate 22 identify the individual holes in the dial mechanism to permit dialing of the desired number in the conventional manner, associated mechanism (not shown) in the base housing being operative in response thereto to apply a corresponding number of impulses to the outgoing line over connecting cord 24. A switch plunger 26 operates in the manner of the hook switch contacts on a conventional desk stand type substation set, the plunger being operative with the substation at rest on the bottom face to connect the substation set ringing equipment to the line conductors, and being operative responsive to raising of the set from its normal standing position to disconnect the substation ringing equipment therefrom and to connect the substation signal transmitting equipment and substation transmitter and receiver thereto.

The specific nature and disposition of the dial and plunger switch responsive elements, the substation circuit network, including the conventional induction coil and antiside tone equipment, and the transmitter and receiver within the confines of the instrument is disclosed in detail in the aforeidentified patents and patent applications. As shown in Figure 1, the novel signaling device 28 may also be disposed within the confines of the base 12 of the instrument, it being apparent that other manners and patterns of mounting the device therewithin or elsewhere will be obvious to parties skilled in the art.

*Circuit network description*

The structure of the novel signaling or ringing circuit 28, and the manner of connecting same with the circuit network of a conventional telephone instrument of the type described in Figure 1 is set forth schematically in Figure 2.

More specifically, with reference to Figure 2, a conventional telephone network 27 is schematically illustrated below dotted line 30, and as there shown includes an input cord conductor 24 comprising line conductors L1, L2, conventionally known in the art as the positive and negative line conductors which connect the substation set to the central exchange.

The basic telephone network 27 is schematically represented in Figure 2 as comprising a transmitter element 17, a receiver element 19, and an induction coil 34 including windings 34A, 34B, 34C, capacitor 32, resistor 38, dial pulse contacts 20, dial off-normal contacts **20*a*, *b*, *c* and plunger switch contacts 26*a*, *b*, *c*. In the normal at rest or idle condition of the set, the plunger switch 26 is depressed, and the dial 20 is in its normal idle condition, whereby plunger switch contacts 26*a* and dial off-normal contacts 20*c* connect the line conductors L1, L2 to the input terminals T1, T4 of the ringing circuit 28, as more fully described hereinafter. The transmitter 17 is disconnected from the line by open plunger switch contacts 26*c* and the dial contacts are rendered ineffective by open dial off-normal contacts 20*a*, 20*c***.

As the subscriber lifts the telephone substation instrument from its idle or at rest position, the plunger switch 26 is released and at its contacts **26*a* interrupts the connection of the ringing circuit 28 across the line conductors L1, L2; and at its contacts 26*b* and 26*c* connects the network including transmitter 17 across the conductors L1, L2, the circuit extending from conductor L1 over contacts 26*b*, induction coil winding 34A, contacts 26*c*, transmitter 17, dial contacts 20′ to the line conductor L2. Receiver element 19 is connected across line conductor L1, L2 with induction coil 34B, the circuit extending from conductor L1 over contacts 26*b*, induction coil windings 34A, 34B, receiver 19, contacts 20*c* and capacitor 32 to line conductor L2, induction coil 34C being connected in shunt of receiver 19** in an obvious manner.

As the dial is now moved from its normal position to the number on the dial plate 22 which corresponds to the first digit to be dialed, the dial off-normal contacts **20*a* are closed to complete a separate pulsing circuit in shunt of the transmitter element 17 and receiver unit 19, which circuit extends from line conductor L1 over contacts 20*a* and dial contacts 20′ to conductor L2. Simultaneously dial off-normal contacts 20*b* are closed, and dial off-normal contacts 20*c* are opened, whereby a protective circuit for the pulsing circuit is completed across the dial contacts 20′, the circuit extending from the right hand side of dial contacts 20′ over resistor 38, contacts 20*b* and capacitor 32 to the left hand side of the dial contacts 20′. As the dial wheel 20 is released, the dial contacts 20′** are interrupted and closed a number of times consistent with the value of the number dialed, and the resultant impulses are transmitted over line conductors L1, L2 to the distant exchange.

As the dial 20 is restored to its off-normal condition following the transmission of the impulses to the distant exchange, off-normal contacts **20*a*, 20*b* are opened to interrupt the dialing circuit, and contacts 20*c* are closed to reconnect the transmitter 17 and the receiver 19** across the line conductors L1 and L2 as described. The number of the desired party is dialed by the calling subscriber in this manner, and as the switching equipment completes the connection to the desired party in response thereto, a conversation may be effected over the line conductors L1, L2 which extend between the subscribers at the respective substations.

*Ringing circuit*

As noted above, the ringing circuit 28 is connected to the line conductors L1, L2 during the period that the instrument 10 is resting on its bottom base face 13, the plunger switch 26 being operative at its contacts **26*a* to connect terminal T1 of the ringing circuit 28 to line conductor L1 and the dial off-normal contacts 20*c*** being operative to connect terminal T4 of the ringing circuit to line conductor L2. As shown, ringing circuit terminals T2, T3 are permanently connected across induction coil windings 34A, 34B for a purpose more fully described hereinafter.

The novel ringing arrangement 28 basically comprises a power source 40, and a transistor blocking oscillator circuit 41, and a tank circuit 77 which together couple actuating signals over terminal T3 to the diaphragm of the telephone receiver 19. Briefly with the application of 20 cycle ringing signals to the line conductors L1, L2 during the period the substation set 10 is in its normal idle condition, the signals are coupled to the power source 40 of the ringing circuit 28 which in turn provides a gentle slope output signal for controlling the oscillator circuit 41 to oscillate at a frequency which is related to the mechanical resonating frequency of receiver 19. It is noted that the natural frequency of the receiver diaphragm is a substantial factor in the determination of the resonating frequency of the receiver as a unit, and accordingly the terms are used interchangeably herein for purposes of simplifying the disclosure.

Tank circuit 77 is operatively controlled by the oscillator circuit 41 to couple an additional pulse set to the receiver during each period that the oscillator is blocked, the amplitude of each successive tank circuit pulse set decreasing with the value of the power source output pulse applied to the oscillator circuit 41. Such variation of signal input introduces a "warble" into the tone output of receiver 19 which results in a melodious pleasant sounding output signal.

More specifically, the power source 40 includes a pair of terminals T1, T5 which are connected respectively to line conductors L1, L2, whereby the incoming 20 cycle ringing frequency are coupled to the power source 40. The power source 40 includes series resistance 42, 44 and 48 connected between terminals T1, T5, rectifier 46 being placed in parallel with resistor 48 to provide unidirectional current flow in the direction indicated responsive to the application of the alternating current ringing signals to the line conductors. A network including a first branch capacitor 50 connected in parallel with resistor 48 and a second branch including series-connected capacitor 52, resistor 54 and diode 56 connected in parallel with capacitor 50 provide a signal output at terminals T5, T6 thereof for controlling the operation of the blocking oscillator circuit 41 which is connected thereto. As shown hereinafter the wave form output which is coupled over terminals T5, T6 to the oscillator circuit 41 basically comprises an undulating direct current signal.

The oscillator circuit 41 which operates in response to application of such signal includes a P–N–P transistor 60, which may be of the conventional type commercially available in the field as a 2N241A General Electric transistor unit, and which includes an emitter 62, a base 64 and a collector 66. Transistor emitter 62 is connected to output terminal T6 of the power source 40, transistor base 64 is connected over resistor 68 to emitter 62 and over the network, including rectifier 70 and capacitor 72, and resistor 74, to the negative side of the power source 40 (T5); and transistor collector 66 is connected over the diaphragm of receiver 19 and the parallelly connected winding 34C of induction coil 34, to the negative conductor L1. A tank circuit 77 connected in the collector circuit includes induction coil windings 34A, 34B and capacitor 78 which are coupled over capacitor 76 to the terminal point for resistance 74 and rectifier 70. As shown in Figure 2, the windings 34A, 34B are wound in opposite relation to the winding 34C of induction coil 34, whereby current flow through winding 34C induces a current in windings 34A, 34B for controlling the operation of the oscillator circuit 40 in a manner now fully set forth.

*Operation of ringing circuit*

As shown in Figure 2, with the telephone hand set in the idle condition (the plunger switch 26 being depressed as a result of the hand set being at rest on its base), the plunger switch contacts 26*a* will be closed, and the dial off-normal contacts 20*c* will be closed, whereby the ringer terminals T1, T4 are coupled to the line conductors L1, L2 respectively.

The applied ringing potential comprises, according to conventional practice, alternate positive and negative half cycles applied at a 20 cycle per second rate. During negative half cycles, terminal L2 is positive with respect to terminal L1, and during positive half cycles, terminal L1 is positive with respect to terminal L2.

The power supply 40 is operative in response to the application of each positive half cycle of energizing current to conductors L1, L2 to provide a fluctuating D.C. output over terminals T5, T6 to the oscillator circuit 41, the variable value of each D.C. output signal effecting a corresponding variation in the amplitude of the successive output signal sets of tank circuit 77 during the period of the signal, and thereby a pleasant sounding "warble" in the tone signal emitted by the receiver diaphragm. Negative half cycles are drained off over a short circuit, the signal output provided by the power source 40 during the positive cycle being such as to extend over at least a portion of the negative cycle time period.

More specifically, as a negative half cycle is applied to the line conductors L1, L2, current flows from conductor L2 (+) over the path which extends over capacitor 32 of the telephone network 27, the normally closed off-normal dial contacts 20*c*, terminal T4, conductor 43, rectifier 46 in the forward direction, resistor 44, jumper J (or resistor 42 with jumper J removed for ringing potentials which are above 100 volts R.M.S.), and plunger switch contacts 26*a* to conductor L1 (−). For purposes of the present example, it will be assumed that the ringing potential is less than 100 volts R.M.S., and that the jumper J is connected in the circuit.

As a positive half cycle is applied to the conductors L1, L2, the power source 40 applies a pulsating direct current $e_{52}$ (Fig. 4) to the output terminals T5, T6 to effect operation of the transistor oscillator 60. More specifically, with reference to Figure 3, during the period of a positive half cycle, conductor L2 (and therefore terminal 5) is negative, and such condition is represented by the horizontal line of Fig. 3. As the potential on conductor L1 increases relative to the potential on L2 during the positive half cycles of ringing current (as represented by the curve $e_{RS}$, Fig. 3), rectifier 46 blocks the passage of current thereover, and establishes a charging path over capacitor 50 which extends from conductor L1, over contacts 26*a*, jumper J, resistor 44, capacitor 50, terminal T5, conductor 43, contacts 20*c* and capacitor 32 to conductor L2.

Figure 3:
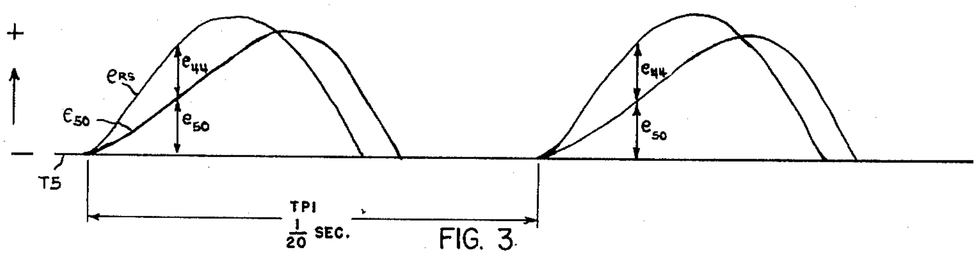

The resultant potential across capacitor 50 during such period is represented by curve $e_{50}$ (Fig. 3). Briefly, as the ringing potential $e_{RS}$ is initially applied, the total voltage is across the resistor 44 (and resistor 47 if jumper J is removed). As current flows in the capacitor 50, the potential of the curve $e_{RS}$ distributes in such a way that the potential $e_{50}$ across the capacitor 50 becomes increasingly greater, and the potential across resistor 44 increasingly less until a point is reached at which the potential across capacitor 50 equals the potential of the applied $e_{RS}$. As the potential of curve $e_{RS}$ thereafter becomes less, capacitor 50 discharges through resistor 44, curve $e_{50}$ lagging the curve $e_{RS}$ as determined by the time constant of 44 and capacitor 50. The peak voltage of capacitor 50 is, of course, somewhat lower than the peak voltage of $e_{RS}$.

Figure 4:
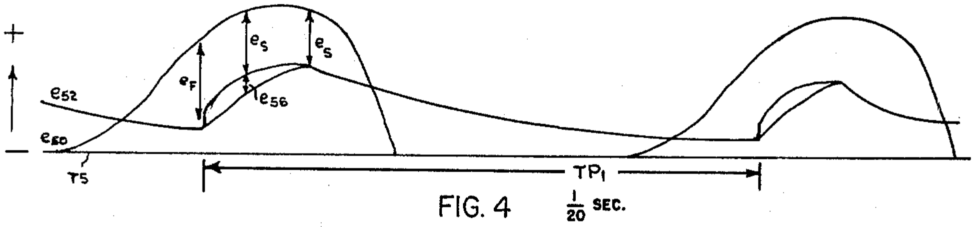

Referring now to Fig. 4, the curve $e_{50}$ has been transferred thereto to represent the potential which appears across capacitor 50 during the positive half cycle of the applied ringing signal, and the curve $e_{52}$ represents the resultant potential which appears across capacitor 52. Since terminals T5, T6 are connected across capacitor 52, the curve $e_{52}$ represents the output of the power source 40 to the oscillator circuit 41 responsive to the application of a positive half cycle of ringing current to conductors L1 and L2. Briefly, as the potential $e_{50}$ across capacitor 50 reaches the firing potential of neon tube 56 (if capacitor 52 has been completely discharged previously); or when the potential of capacitor 50 minus the potential of capacitor 52 reaches the ionizing potential $e_F$ of neon tube 56, whenever capacitor 52 has not been completely discharged previously (see $e_F$, Fig. 4), tube 56 conducts to complete an obvious charging circuit for capacitor 52. During the charging of capacitor 52, the difference of potential between capacitors 50 and 52 consists of the sustaining potential of tube 56 represented by $e_S$ (Fig. 4) which is a constant and the potential drop across resistor 54 which is a variable, represented by $e_{54}$. As the charging of capacitor 50 reaches a maximum and decreases, $e_{54}$ disappears as the difference in potentials of capacitors 52 and 50 falls below the sustaining potential of tube 56, and the same becomes extinguished. The potential output represented by $e_{52}$ (Fig. 4) which appears across terminals T5, T6 is applied to the oscillator circuit 41, terminal T6 being positive with respect to terminal T5 at all times during the cycle.

After tube 56 is extinguished, capacitor 52 begins discharging over the path which extends from terminal T6 over resistor 68 in parallel with the emitter-to-base path of the transistor 60, rectifier 70, resistor 74 and conductor 43 back to terminal T5, the discharge of capacitor 52 maintaining terminal T6 positive between the application of successive positive half-cycles of ringing current. Referring to curve $e_{52}$ of Fig. 4, it can be seen that if the value of capacitor 52 is chosen so that capacitor 52 never becomes completely discharged, terminal T6 will (*a*) always remain positive with respect to terminal T5, (*b*) reach a maximum value during each positive half-cycle of ringing current, (*c*) will drop in potential gradually between positive half cycles of ringing current to a low value, and rise again to a maximum value during the next half-cycle in a continuous manner. As will be appreciated more fully hereinafter, such power variation introduces a "warble" into the tone emitted by the diaphragm of receiver 19, and therefore a more melodious and pleasant sounding signal.

Briefly restating the foregoing teaching, each positive half-cycle of ringing current coupled over the line conductors L1, L2 controls the power source 40 to provide a fluctuating positive potential output of a variable value at its terminals T5, T6 as represented by curve $e_{52}$, Fig. 4. In effect, therefore terminals T5, T6 become the poles of a battery, terminal T6 being the positive pole of the battery and terminal T5 the negative pole, the potential output of the "battery" being represented by curves $e_{52}$ and T5 (Fig. 4), respectively.

With the application of such potential output to the terminals T5, T6, the transistor is energized over a circuit extending from terminal T6 (+), resistor 68, rectifier 70, resistor 74 to terminal T5 (−). At this time, (1) The transistor base 64 is negative relative to the transistor emitter 62 since the base 64 of transistor 60 is connected to a point on the voltage divider comprising resistors 68, 74, (2) Negative potential is applied to the collector 66 over the path which extends from terminal T5 and over the parallel circuit including section 34C of the telephone induction coil 34 and the receiver 19 to the transistor collector 66, (3) Positive potential is applied to the transistor emitter 62 over the path which extends from terminal T6 directly to the emitter 62.

The transistor is thus connected as a "grounded-emitter" type transistor, wherein the control signals are coupled over the emitter 62 and base 64, and the amplified output signal circuit is extended over the collector 66.

With terminal T6 positive with respect to terminal T5, a charging path is established for capacitor 76, which circuit extends from terminal T6 through the emitter-base path of the transistor 60 in parallel with resistor 68, over rectifier 70, capacitor 76, terminal T2, sections 34A, 34B and 34C of the induction coil 34 and conductor 43 to terminal T5. A small amount of current also passes over resistor 74 directly to terminal T5.

Capacitor 76 tends to charge to the potential which exists at its point of connection to the voltage divider which includes the circuit extending from terminal T5, the emitter-base path of the transistor 60 in parallel with resistor 68, rectifier 70, resistor 74 and terminal T5, assuming terminal T2 is approximately at the potential of terminal T5.

Under these circumstances, the potential at the point of connection of capacitor 76 to the voltage divider circuit is approximately the potential of terminal T6 because of the low forward resistance of the transistor 60 and rectifier 70. Thus the potential across capacitor 76 would tend to be almost that of the "battery," i.e., that across terminals T5 and T6. (See left end of curve C76—Fig. 5.) However, as the emitter-base path conducts, an amplified output current flows over the path which extends from terminal T6 over the emitter-collector path of the transistor 60, through section 34C of the induction coil 34 and the receiver 19 in parallel therewith, to conductor 43 and terminal T5. As this current flows, the potential of terminal T3 becomes more postiive. (See Fig. 5*b*.) Also as a result of current build-up in section 34C, a voltage is induced across windings 34A and 34B in series, such that point T2 becomes increasingly more negative than the potential of terminal T5. (See Fig. 5*b*.) (As noted above, induction coil winding 34C is wound and connected in a sense opposite to that of winding directions of setcions 34A and 34B, and with the induced potential in windings 34A and 34B in additive relative to each other.)

As a result of this induced potential, capacitor 76 charges over the path which extends from terminal T6 through the emitter-base path of the transistor in parallel with resistor 68, rectifier 70, capacitor 76, terminal T2, windings 34A, 34B and 34C of the induction coil 34 and conductor 43 back to terminal T5 according to the algebraic sum of the voltages in the circuit. As capacitor 76 charges, more control current flows in the emitter-base path, in turn resulting in an increase of current flow in the emitter-collector output path of the transistor 60. The resultant increase in current flow in the emitter collector path and over winding 34C results in an increased induced feedback which results in an increased control current flow. Such "round-robin" increase in current flow continues until the emitter-collector output path of the transistor 60 reaches a potential which is approximately the potential of terminal T6.

As the voltage of the transistor collector 66 approaches that of the emitter 62, the rate of change of current decreases, and the inductive feedback from winding 34C to 34A, 34B also decreases. As a result, the voltage at terminal T3 decerases and the voltage at terminal T2 now increases in value toward the potential of terminal T5. As the potential of point T2 thus increases in the positive direction, the potential applied to the upper plate of capacitor 76 correspondingly increases in the positive direction (in accordance with known capacitor operation), to thereby increase the positive bias signal applied to the transistor base 64 toward the value of the positive signal applied to emitter 62, and a further reduction in transistor current flow results. The reduction in the transistor current flow, in turn, effects a further reduction in the potential at terminals T3, and such pattern of operation with terminal T3 going progressively more negative and terminal T2 going progressively more positive.

Figures 5A, 5B:
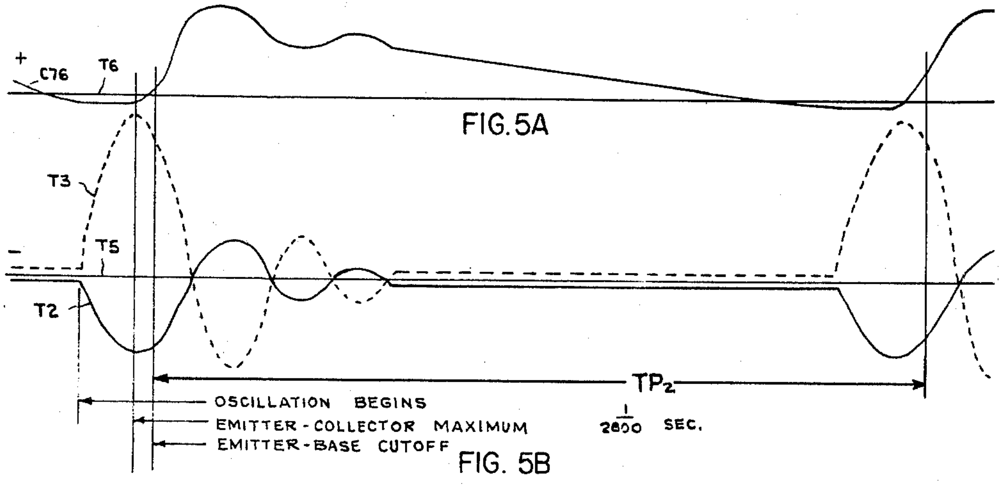

As the potential on the upper plate of capacitor 76 increases to the approximate value of the potential of the power source terminal T6, the transistor is blocked and current flow in the emitter-base control path ceases. (Fig. 5*b*.) As current flow in the emitter-collector output path ceases, i.e., the cut-off point of the transistor 60 has been reached, the transistor 60 is in the blocked condition, and the tuned circuit comprising the coil winding 34A, 34B and capacitor 78 will go through damped oscillations, the frequency and duration of the oscillations depending upon the constants and Q of the circuit which is in turn determined by the value of the selected components. The tank circuit output signals are thus applied to the receiver 19 immediately subsequent to the termination of each oscillator pulse to extend the duration of the receiver output signal, the components of the tank circuit being selected so that the amplitude and frequency of the tank circuit signal set is different than the oscillator signal set to thereby introduce a variation in the tone output of the receiver as described hereinafter.

When capacitor 76 now discharges to the point where the potential of the upper plate of capacitor 76 is more negative than the potential of terminal T6, the transistor 60 again conducts, and a subsequent output pulse is initiated.

The oscillator circuit 41 cycles in this manner, the pulses being generated at a frequency which coincides with the mechanical resonant frequency of the receiver 19, and being applied to the receiver diaphragm to control same to provide a tone output signal. Each pulse signal applied by the oscillator circuit 41 is in effect extended in duration by the tank circuit 77, which generates at least one set of pulse oscilaltions, such as shown in the waveform representations of Fig. 6*b*, as each pulse output by the oscillator is terminated. In the present example, the frequency of the added pulse set is of a higher frequency than the frequency output of the oscillator and of a relatively short duration. Further the amplitude of successive signal sets generated by the tank circuit 77 subsequent to each oscillator pulse during the time period of a positive half cycle of applied ringing current ($TP_1$) is reduced in a manner related to the decay of the output signal of power source 40 (Fig. 6*a*), such variation being effected to introduce a warble into the output signal of the receiver unit 19.

Figure 6A:
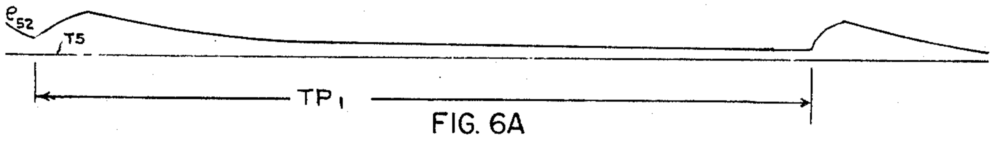

Briefly, it is recalled that the amplitude of the waveform output of the power source 40 ($e_{52}$—Fig. 4), which energizes the oscillator circuit 41 comprises an initially fast rise slope followed by a gentle decaying slope which obtains for the period of the positive cycle of the applied ringing current and extends into a portion of the negative cycle, the time period $TP_1$ shown in Fig. 6*a* being a schematic representation of the output of the power source 40 during the time period $TP_1$.

Figure 6B:
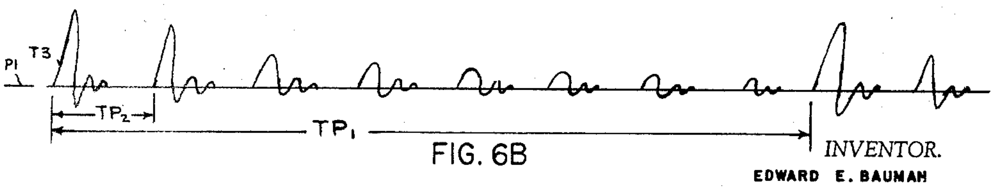

It is apparent that as the waveform output of the power source 40 progresses during the time period $TP_1$, a potential of decreasing value is applied to the emitter collector circuit of transistor 60, and there is a corresponding reduction in the voltage signal at the tank circuit 77 in each successive energization thereof by transistor 60 during the time period $TP_1$. The reduced voltage of the tank circuit 77 in turn results in a decreased amplitude of the pulses in the successive sets of oscillations during such time period, as is clearly indicated in the schematic showing of Fig. 6*b*. It is noted that the number of impulse sets shown in Fig. 6*b* is only intended to indicate the manner in which the amplitude is reduced for successive sets of impulses, and is obviously not indicative of the number of pulse sets which occur during the period $TP_1$.

Since the successive pulse outputs of the tank circuit 77 are gradually reduced in amplitude during a time period $TP_1$, there is a corresponding decrease in the amplitude of the signals applied thereby to the receiver unit during the added period following each oscillator pulse, and in actual practice, such decreasing amplitude results in the provision of a melodious tone signal which is extremely pleasant sounding to the ear.

Summarily, it will be apparent that the novel ringing arrangement 28 is operative in response to the application of 20 cycle ringing current to line conductors L1, L2 to excite receiver 19 to provide a melodious tone output. In accomplishing such signal output, the positive half cycles of the applied ringing signal are utilized by the power source 40 to energize an oscillator circuit 41, the components of which are preselected to cause same to oscillate at a rate which is consistent with the resonant frequency of the receiver 19. Further the output signal of the power source 40, in response to an applied ringing signal positive cycle in an undulating signal which as applied to the oscillator circuit 41 and the tank circuit 77 effects a corresponding variation in the value of the output signals applied to the receiver unit, and thereby a pleasant "warble" in the signal output of the receiver unit.

*Signal generator protection means*

During the period that ringing signals are applied to the telephone substation set, the plunger switch 26 is normally depressed, and its contacts **26*a* and off-normal dial contacts 20*c* connects the ringing circuit 28 across the line conductors L1, L2. As the hand set is lifted for use, the plunger switch 26 operates, and at its contacts 26*a* disconnects the ringing arrangement 28 from the line, and at its contacts 26*b*, 26*c* connects the transmitter 17 and receiver 19 across the line conductors L1, L2 for use by the subscriber in initiating a call or answering an incoming call. It is apparent that under such conditions the electronic ringing arrangement 28 is disconnected from the line conductors, and a dialing operation wherein dial contacts 20′ are operated will not enter the ringing circuit 28**.

However, in the event that the illustrated substation set is connected as an extension phone or on a party line, it is apparent that the ringing circuit 28 of the set illustrated in Figure 2 may be connected to the line conductors L1, L2 while a call is being initiated by a subscriber at a second substation set connected to line conductors L1, L2. According to a feature of the invention, the ringing arrangement 28 inherently incorporates a signal generator protection arrangement.

More specifically, as is well known in the art, two types of voltages appear across the line during dialing. The first type of pulse is a 48 volt peak to peak wave, and the second pulse is a sharp spike or series of short spikes because of the change of the current in the inductance in the line. In the present arrangement the 50 volt direct current dialing pulses on line conductors L1, L2 are extended over the ringing circuit 28 and capacitor 50 and power source 40, and the capacitor 50 does not charge to a value sufficient to effect the firing of neon bulb 56. The negative spikes of each cycle are shunted over the rectifier 46 and the path previously described for negative ringing half cycles. To preclude operation of the signal generator means in the ringing arrangement by the short spikes of the higher values, the capacitor 50 and resistor 44 are selected from values which provide a time constant of such duration that capacitor 50 cannot charge to a value sufficient to fire diode 56. Thus lower frequency spikes of shorter duration are shunted over resistor 48, and higher value spikes of short duration are accumulated momentarily by capacitor 50, and subsequently discharged over the line without disturbing the signal generator means of the ringing arrangement 28. It will be apparent to parties skilled in the art that a thermistor unit may be used in lieu of resistor 44 and capacitor 50, the capacitor in such arrangement being of a lower capacity.

*Specific unit*

The illustrated oscillator circuit 41 in the ringing arrangement 28 set forth herein is operative with the receiver unit of a standing hand set of the type shown in Figure 1, the mechanical resonating frequency of such unit being in the order of 2800 cycles per second. The frequency of the oscillator circuit 41 is basically determined by the RC time constant of capacitor 76 and resistor 74 which control the potential applied to the base 64 of transistor 60, and accordingly the time of blocking and unblocking of the oscillator circuit 41.

In an operable arrangement reduced to practice in the field the following sets of values were found to provide a melodious tone signal in an instrument of the type shown in Figure 1. (The illustrated unit is commercially available under the trade name "Ericofone.")

Resistor 74=56K with ½ W rating
Resistor 68=47K with ½ W rating
Resistor 54=1K with ½ W rating
Resistor 44=6.8K with ½ W rating
Resistor 42=8.2K with ½ W rating
Resistor 48=100K with ½ W rating
Capacitor 52=3.5 mf. with 50 WV rating
Capacitor 50=1.0 mf. with 200 WV rating
Capacitor 76=0.01 with 200 WV rating
Capacitor 78=0.01 mf. with 200 WV rating
Capacitor 72=300 mmf. with 200 WV rating
Rectifier 70=2T1 International Rectifier Corporation Rectifier 46=4U1 International Rectifier Corporation
Neon bulb 56=NE7 General Electric Company
Transistor 60=2N241A General Electric (PNP)
Induction coil A—32 ohms—540 turns
Induction coil B—46 ohms—608 turns
Induction coil C—125 ohms—356 turns It will be found that when normal ringing voltages are applied at frequencies between 16 and 66 cycles per second, approximately 40 milliwatts of tone power is applied to the receiver.

It is noted that the capacity of capacitor 52 could be increased to the point where there would be no warble, or alternatively the capacity of capacitor 52 could be so decreased that complete cut-off of sound would occur between positive half cycles. Capacitor 72, as noted above, is of very low capacity and has very little effect upon the control of the circuit, but has been found to improve the tone.

The foregoing description is believed to constitute an accurate theoretical analysis of the manner in which the circuitry of Figure 2 is operative to provide a melodious fluctuating tone signal. However, it is to be understood that the teaching of the nature of the components, the value of the components, and their manner of connection is considered to be a complete teaching of the invention which in itself complies with the statutory requirements, and such theoretical explanation is to be considered indicative rather than limiting as to the scope and breadth of the invention.

*Selective frequency ringing*

The novel signaling device also lends itself for ready use with a selective ringing system. That is, in most larger size telephone exchanges, it has been found to be economically advantageous to use certain of the subscriber lines to provide service for more than a single subscriber, and in such arrangement, to provide a signaling system wherein each of the subscribers on such a line may be independently signaled without disturbing the other subscribers thereon.

In one such type system, different frequent signals are used to signal the different subscribers on the line. For example, the substation of the first subscriber on the line may be adjusted to respond to the application of ringing signals a frequency of 16⅔ c.p.s.; the second substation thereon may be adjusted to respond in response to a ringing frequency of 33⅓ c.p.s.; a third substation on the line may be adjusted to respond to a ringing frequency of 50 c.p.s., etc. Thus as a ringing frequency of one of these values is applied to the line, only the desired subscriber on the line is signaled.

With reference to Figure 7, there is shown thereat, a selective frequency ringing device 80 which may be utilized at a substation to provide the selective actuation of its associated receiver to provide a melodious signal tone responsive only to the application of a preassigned frequency thereto. More specifically, as there shown, the vibrating unit 80 basically comprises a suitable mounting member 82 which supports a vibrating bar 84 for pendulum-like movement as energized by a pair of driving coils 86, 88 in response to the application of the preassigned ringing frequency to the line conductors L1, L2. A pair of tuning weights 90 mounted on opposite sides of the vibrating bar 84 are adjustable to different positions along the length thereof to vary the resonating frequency of the bar in accordance with conventional vibrating reed principles. Ostensively, the tuning weights 90 at a substation unit will be adjusted to the particular position which renders the bar responsive to the frequency which is preassigned to the substation.

A pair of contact sets 92, 94 disposed on opposite sides of the vibrating bar 84 are opened and closed repeatedly by the vibrating bar in its movement between its positions by driving coils 86 and 88.

A direct current integrator circuit 96 including resistor 98 and capacitor 100 is connected to the contact sets 92, 94, and the output of the integrator circuit is coupled over a pair of associated terminals T5′, T6′ to the associated equipment. Battery potential 102 is coupled between terminal T6′ and the vibrating bar 84.

It is apparent that as the proper preassigned frequency is applied to line conductors L1, L2, the alternating current effects the alternate energization of the driving coils 86, 88 and the movement of the vibrating bar 84 into circuit making relation successively and independently with contacts 92 and 94. The resultant current flow from the potential source 102 over the direct current integrator circuit 96 provides a pulsating D.C. current at terminals T5′, T6′. It is apparent that coupling of the output of terminals T5′, T6′ to the terminals T5, T6 of the ringing arrangement 28 of Figure 2 will effect the operation of the receiver 19 in the manner described heretofore.

The vibrating bar may ostensibly be mounted within the confines of the substation instrument in any manner desired. One preferred form of mounting of the unit has been schematically illustrated in Figure 8, it being apparent that such manner of mounting permits the utilization of a vibrating bar of greater length and therefore increased selectively. Other methods of mounting the unit will be readily apparent to parties skilled in the art.

While there is described herein a preferred embodiment of my invention, it will be apparent that various modifications, changes and re-arrangements may be made without departing from the scope of the present invention, as defined by the appended claims.

I claim:

1. In a telephone substation instrument adapted for use in a telephone system including a receiver unit having a diaphragm for reproducing voice frequency signals, signal generating means including an oscillator circuit operative as energized to generate a set of output signals, input means for coupling incoming ringing signals to said signal generating means to energize the same, and output means for coupling the signal output of said signal generating means to the diaphragm of said receiver unit to enable same to provide a signal tone.

2. In a telephone substation instrument adapted for use in a telephone system including a receiver unit for reproducing voice frequency signals, signal generating means including an oscillator circuit operative to provide an output signal of a frequency which is harmonically related to the resonant frequency of said receiver unit, input means for coupling incoming ringing signals to said signal generating means to energize same, and output means for coupling the signal output of said signal generating means to said receiver unit to activate same in the provision of an audible tone signal.

3. In a telephone substation instrument a ringing circuit, a network including a receiver unit having a diaphragm for reproducing voice frequency signals, an input circuit for said substation instrument, means for coupling the ringing circuit to said input circuit and for alternatively connecting said network thereto, signal generating means including an oscillator circuit connected in said ringing circuit operative to provide a signal output in response to the application of incoming ringing signals over said input circuit to said signal generating means, and output means for coupling said signal output to the diaphragm of said receiver unit to activate same in the provision of an audible tone output.

4. In a telephone substation instrument including a receiver unit having a diaphragm for reproducing voice frequency signals, signal generating means operative to provide a first and a second set of signal pulses, the pulses of the second set being of a different frequency than the pulses of the first set, input means for coupling incoming ringing signals to said signal generating means to energize same, and output means for coupling the signal output of said signal generating means to the diaphragm of said receiver unit to activate same in the provision of a variable audible tone signal.

5. In a telephone substation instrument including a receiver unit having a diaphragm for reproducing voice frequency signals, signal generating means including a first control circuit for providing a first set of signal pulses, a second control circuit operatively controlled by said first signal set to provide a second set of output signals responsive to the termination of a pulse of said first set, and output means for coupling said first and second sets of signal pulses to the diaphragm of said receiver unit to actuate same in the provision of an audible tone output.

6. In a telephone substation instrument including a receiver unit having a diaphragm for reproducing voice frequency signals, an input circuit over which incoming ringing signals are received, signal generating means including means for providing a first and a second set of impulses in response to each cycle of said incoming signals, the impulses of said second set being interspersed between the impulses of said first set and of a successively decreasing amplitude during the period of a cycle of said incoming signals, and output means for coupling the signal output of said signal generating means to the diaphragm of said receiver unit to actuate same in the provision of an audible tone signal which varies with at least the amplitude of the applied sets of signal impulses.

7. In a telephone substation instrument having a network including at least a transmitter, a receiver, and a multi-winding induction coil for transmitting and reproducing voice frequency signals, and input means over which ringing signals are received, signal generating means comprising an oscillator circuit for providing a set of output signal pulses in response to receipt of a ringing signal including at least a pair of said induction coil windings connected to establish the feedback path for the oscillator circuit, and output means for coupling the signal output of said signal generating means to the diaphragm of said receiver unit to actuate same in the provision of an audible tone output.

8. In a telephone substation instrument having a network including at least a transmitter, a receiver, and a multi-winding induction coil for transmitting and reproducing voice frequency signals, signal generating means comprising an oscillator circuit for providing a first set of signal pulses including at least a pair of said induction coil windings connected to establish the feedback path for said oscillator circuit, a tank circuit including at least one of said induction coil windings connected to the transistor output path to provide a second set of signal pulses, and output means for coupling the output signals of said oscillator circuit and said tank circuit to the diaphragm of said receiver unit to actuate same in the provision of an audible tone output.

9. In a telephone substation instrument having a network including at least a transmitter, a receiver and a multi-winding induction coil for transmitting and reproducing voice frequency signals, a ringing circuit including a power source for providing a set of undulating direct current control signals responsive to the application of a set of ringing signals thereto, an oscillator circuit for providing a first set of signal pulses for the period of application of said control signals thereto by said power source, circuit means connected to said oscillator circuit to provide a second set of output pulses subsequent to the termination of each pulse of said first set of signal pulses, and output means for coupling the first and second set of signal pulses to the diaphragm of said receiver unit to actuate same in the provision of an audible tone output.

10. In a telephone substation instrument having a network including at least a transmitter, a receiver, and a multi-winding induction coil for transmitting and reproducing voice frequency signals, a ringing circuit including a power source for providing an undulating direct current output signal responsive to the application of an input ringing signal thereto, signal generating means comprising an oscillator circuit for providing a first set of signal pulses for the period of application of one of said output signals thereto by said power source, signal circuit means connected to the output path of said oscillator circuit operative in response to the termination of each output pulse by said oscillator circuit to generate a second set of pulses, the amplitude of successive sets of pulses of said signal circuit means being decreased successively during the period of an output signal of said power supply source applied to said oscillator circuit, and output means for coupling the output pulses of said oscillator circuit and signal circuit means to the diaphragm of said receiver unit to actuate same in the provision of an audible tone output.

11. In a telephone substation instrument having a network including at least a transmitter, a receiver, and a multi-winding induction coil for transmitting and reproducing voice frequency signals, input means over which ringing signals are received, signal generating means comprising an oscillator circuit for providing a set of output signal pulses in response to the receipt of an incoming ringing signal including a control signal input path, a signal output path, means for coupling one of said windings in said output path, means for coupling at least a second one of said windings in a feedback path between said signal output path and said control signal path, the second winding being wound in signal inductive relation with said first winding, whereby signals related to the output signals in said output path are induced into said feedback path, and output means for coupling said output path to the diaphragm of said receiver unit to actuate same in the provision of an audible tone output.

12. In a telephone substation instrument having a network including at least a transmitter, a receiver, and a multi-winding induction coil for transmitting and reproducing voice frequency signals, input means over which ringing signals are received, signal generating means comprising an oscillator circuit for providing a set of output signal pulses in response to the receipt of an incoming ringing signal including a control signal input path, a signal output path, means for coupling one of said windings in said output path, means for establishing a feedback path between said signal output path and said signal input path including at least a second one of said windings and a potential storage device, the winding in said output path effecting the induction of related signals over the winding in said feedback path and a corresponding variation in the potential of said device in said feedback path to thereby control the oscillating condition of said oscillator circuit; and output means for coupling the said output path to the diaphragm of said receiver unit to actuate same in the provision of an audible tone output.

13. In a telephone substation instrument having a network including at least a transmitter, a receiver, and a multi-winding induction coil for transmitting and reproducing voice frequency signals, input means over which ringing signals are received, signal generating means comprising an oscillator circuit for providing a set of output signal pulses in response to the receipt of an incoming ringing signal including a control signal input path, a signal output path, means for coupling one of said windings in said output path, means for coupling at least a second one of said windings in a feedback path between said output path and said input path, a first potential storage device connected in series with said winding in said feedback path, a second potential storage device connected in parallel with said second winding to establish a tank circuit therewith, and output means for coupling the diaphragm of said receiver unit to the output path for said oscillator circuit and the output of said tank circuit for actuation thereby in the provision of an audible tone output.

14. In a telephone substation instrument having a network including at least a transmitter, a receiver and a multi-winding induction coil for transmitting and reproducing voice frequency signals, signal generating means comprising an oscillator circuit for providing a set of output signal pulses in response to the application of an input signal thereto including a transistor unit having a collector element, a base element, and an emitter element, a signal input circuit coupled to said emitter and base elements, a signal output path connected to said collector element, a feedback path for said transistor unit including at least one of said windings and a capacitor unit connected between said collector and said base elements, and means for connecting a second one of said windings, which is in inductive relation with said first winding, and said receiver unit in said signal output path.

15. In a telephone substation instrument having a network including at least a transmitter, a receiver and a multi-winding induction coil for transmitting and reproducing voice frequency signals, a first one of said windings being connected in inductive relation with a second one of said windings, signal generating means comprising an oscillator circuit for providing a set of output signal pulses in response to the application of an input signal thereto including a transistor unit having a collector element, a base element, and an emitter element, a signal input circuit coupled to said emitter and base elements, a signal output path connected to said collector element, at least said other one of said windings and a capacitor connected between said collector and said base elements, a capacitor connected in shunt of said other winding to provide a tank circuit, and means for connecting said receiver unit and said one winding to said signal output path and said tank circuit.

16. In a telephone substation instrument, a signal reproducing device, signal generating means including a first pulse generator means for providing a first set of signal pulses responsive to receipt of each input signal, a second pulse generator means connected to said first pulse generator means to provide a set of output signals subsequent to each output pulse of said first set, and output means for coupling the signal output of said first and second pulse generator means to said signal reproducing device to actuate same in the provision of an audible tone output.

17. In a telephone substation instrument including a receiver unit having a diaphragm for reproducing voice frequency signals, input means over which alternating current ringing signals are received, power source means comprising storage means for storing a potential charge responsive to the receipt of an incoming ringing signal, and supply means operative to derive an undulating direct current output signal from the potential charge on said storage means, signal generating means including an oscillator circuit for providing a set of signal pulses as energized, means for coupling said undulating output signals to said signal generating means to energize said oscillator circuit, and output means for coupling said oscillator signal pulses to the diaphragm of said receiver unit to actuate same in the provision of an audible tone signal.

18. In a telephone substation instrument including a receiver unit having a diaphragm for reproducing voice frequency signals, input means over which alternating current ringing signals are received, power source means comprising a first potential storage means, a resistor member, and a rectifier member parallelly connected with each other and in series with a second resistor to said input, and supply means including a second potential storage device, a second rectifier and a third resistor connected in series across said first potential storage means, signal generating means operative as energized to generate a diaphragm-actuating signal, means for coupling the output of said supply means to said signal generating means to energize the same, and output means for coupling the signal output of said signal generating means to the diaphragm of said receiver unit.

19. In a telephone substation instrument including a receiver unit having a diaphragm for reproducing voice frequency signals, signal generating means operative to provide a set of diaphragm vibrating signals, input circuit means for coupling incoming ringing signals to said signal generating means to effect the energization thereof, means in said input circuit means for preventing improper operation of the signal generating means by certain spurious signals comprising a rectifier member connected to by-pass spurious signals of one polarity relative to said signal generating means, and a resistor capacitor circuit connected to absorb spikes of the second polarity which are of less duration than the time constant of the resistor capacitor circuit, and output means for coupling the signal output of said signal generating means to the diaphragm of said receiver unit to actuate same in the provision of an audible tone signal.

20. In a telephone substation instrument including a receiver unit having a diaphragm for reproducing voice frequency signals, signal generating means operative to provide a set of diaphragm vibrating signals, input means for coupling incoming ringing signals to said signal generating means to effect the energization thereof, means for preventing improper operation of the signal generating means by certain spurious signals comprising a first means operative to absorb short current spikes of at least one polarity prior to activation of said signal generating means thereby, means for shorting current spikes of the second polarity relative to said signal generating means, and output means for coupling the signal output of said signal generating means to the diaphragm of said receiver unit to actuate same in the provision of an audible tone signal.

21. In a telephone substation instrument including a receiver unit having a diaphragm for reproducing voice frequency signals, input means over which energizing ringing signals are received, selective frequency responsive means for providing an output signal only in response to the application of a ringing signal of a preassigned frequency thereto, signal generating means including an oscillator current coupled to said selective frequency means operative to provide a set of control signals as energized by said output signals, and means for coupling the control signal output of said signal generating means to the diaphragm of said receiver unit to actuate same in the provision of an audible tone signal.

22. A substation instrument as set forth in claim 21 in which said selective frequency means includes vibratory means operative in response to the application of an alternating current ringing signal of said preassigned frequency thereto, and a direct current integrator circuit connected to said vibratory means to provide undulating direct current output signals to said signal generating means.

23. In a telephone substation instrument including a receiver unit having a diaphragm for reproducing voice frequency signals, input means over which alternating current ringing signals are received, conversion means for converting the incoming alternating current ringing signals to direct current signals, signal generating means including an oscillator circuit for providing signals as energized, means for coupling the direct current signals from said conversion means to said signal generating means to energize said oscillator circuit, and output means for coupling the signal output of said signal generating means to said receiver unit to actuate the diaphragm in the provision of an audible tone signal.

24. In a telephone substation set comprised of a unitary structure for supporting each of the components of the substation set, a transmitter element supported by said structure, a receiver element having a diaphragm for reproducing voice frequency signals supported by said structure, said receiver element being supported on said structure to be located adjacent the ear of the user with positioning of said transmitter element adjacent the mouth of the user, signal generator means including an oscillator circuit supported by said structure operative as energized to generate a set of output signals, input means for coupling incoming ringing signals to said signal generator means to energize the same, and output means for coupling the signal output of said signal generator means to the diaphragm of said receiver element to activate same in the provision of an audible tone signal.

25. In a telephone substation set comprised of a unitary structure for supporting each of the components of the substation set, a surface on said structure for supporting the set when not in use by the subscriber, a transmitter element suported by said structure, a receiver element supported by said structure, said receiver element being supported on said structure to be located adjacent the ear of the user with positioning of said transmitter element adjacent the mouth of the user, means for coupling said substation set to a communication line including switch means operative to a first position with the substation set at rest on said surface, and a second position when said set is removed from said surface, signal generator means including oscillator means supported by said structure, said switch means being operative in said first position to couple ringing signals on said communication line to said signal generator means to effect the operation thereof, and operative in said second position to disable said signal generator means, and to connect said transmitter and receiver elements to said communication line; and output means for coupling the signal output of said signal generator means to said receiver element to activate same in the provision of an audible tone signal.

References Cited in the file of this patent

UNITED STATES PATENTS

| | | |
|---|---|---|
| 2,589,800 | Goodale et al. | Mar. 18, 1952 |
| 2,604,545 | Inglis et al. | July 22, 1952 |
| 2,759,179 | Kircher | Aug. 14, 1956 |
| 2,761,909 | Wallace | Sept. 4, 1956 |
| 2,808,463 | Jenkins et al. | Oct. 1, 1957 |
| 2,823,267 | Meadran | Feb. 11, 1958 |

UNITED STATES PATENT OFFICE

CERTIFICATE OF CORRECTION

Patent No. 2,951,910 September 6, 1960

Edward E. Bauman

It is hereby certified that error appears in the printed specification of the above numbered patent requiring correction and that the said Letters Patent should read as corrected below.

Column 16, line 41, for "current" read -- circuit --.

Signed and sealed this 11th day of April 1961.

(SEAL)
Attest:

ERNEST W. SWIDER
Attesting Officer

ARTHUR W. CROCKER
Acting Commissioner of Patents